United States Patent

Harada et al.

Patent Number: 5,910,750
Date of Patent: Jun. 8, 1999

[54] LOW POWER CONSUMPTION SWITCHING DEVICE FOR POWER SOURCE

[75] Inventors: Naofumi Harada; Satoshi Kizawa; Yuji Tadano; Kaoru Kawata, all of Tokyo, Japan

[73] Assignee: Mitsubishi Denki Kabushiki Kaisha, Tokyo, Japan

[21] Appl. No.: 09/040,454

[22] Filed: Mar. 18, 1998

[30] Foreign Application Priority Data

Sep. 29, 1997 [JP] Japan ................................. 9-263056

[51] Int. Cl.$^6$ ............................................. G05F 1/10
[52] U.S. Cl. ............................................. 327/544; 327/530
[58] Field of Search ........................... 327/544, 530, 327/531, 547, 527

[56] References Cited

U.S. PATENT DOCUMENTS

| | | | |
|---|---|---|---|
| 4,920,284 | 4/1990 | Denda | 326/74 |
| 5,408,149 | 4/1995 | Aneha et al. | 327/544 |
| 5,450,027 | 9/1995 | Gabara | 326/98 |
| 5,504,452 | 4/1996 | Takenaka | 327/541 |
| 5,583,457 | 12/1996 | Horiguchi et al. | 326/121 |
| 5,614,847 | 3/1997 | Kawahara et al. | 326/98 |
| 5,712,589 | 1/1998 | Afek et al. | 327/538 |
| 5,781,062 | 7/1998 | Mashiko et al. | 327/544 |
| 5,812,386 | 9/1998 | Youn | 363/86 |
| 5,969,465 | 12/1998 | Ishizuka | 327/544 |

FOREIGN PATENT DOCUMENTS

| | | |
|---|---|---|
| 5-241696 | 9/1993 | Japan . |
| 6-83491 | 3/1994 | Japan . |
| 6-161617 | 6/1994 | Japan . |

Primary Examiner—Kenneth B. Wells
Assistant Examiner—Maria Hasanzadah
Attorney, Agent, or Firm—Burns, Doane, Swecker & Mathis, LLP

[57] ABSTRACT

In order to reduce power consumption of the electronic device while it is inactive, the main switch 32 is shifted to the non-conductive state when the electronic device driven by the battery is stopped and the actuating signal decreases below a predetermined voltage, the actuating signal representing the state where the device is in operation. Thus, the power supplied to the control circuit or the like of the electronic device from the battery becomes zero, should a leak current or the like is ignored, and the power consumption can be reduced. In order to start the electronic device, the switch 34 is turned on and the main switch 32 is forced to the conductive state. That is, when the electronic device is started and the actuating signal exceeds the predetermined voltage, the main switch 32 becomes conductive and the electronic device receives power from the battery. In this state, even if the switch 34 is opened, the main switch 32 still remains conductive unless the actuating signal is stopped. Repeated, the main switch 32 is non-conductive while the electronic device is inactive, so that the waste of power of the battery can be prevented.

7 Claims, 4 Drawing Sheets

LOW POWER CONSUMPTION SWITCHING DEVICE FOR POWER SOURCE

BACKGROUND OF THE INVENTION

1. Field of the Invention

The present invention generally relates to controlling a power source of an electronic device, and more particularly to the control of a power source, which allows power consumption of the power source to be reduced while the electronic device is inactivated.

2. Description of the Prior Art

Various electronic devices are supplied with power from a battery or a commercial power source. FIG. 4 shows functional blocks representing the peripheral components surrounding a power source circuit in an electronic device, such as a notebook-sized PC.

In FIG. 4, a functional circuit 10 is provided to accomplish the original function of electronic devices, such as a PC or a cellular phone. The functional circuit 10 receives power from an AC adapter, a battery, or the like via a DC/DC converter 12. The AC adapter refers to a device for converting a power voltage to a predetermined DC voltage. The battery can be various types of batteries, such as a commonly used alkali-manganese battery, a lithium-ion battery, or other batteries. The DC/DC converter 12 converts the received voltage to a proper voltage before supplying it to the functional circuit 10, since the voltage from the AC adapter or battery may be unstable. The DC/DC converter 12 can be omitted if the functional circuit 10 is capable of responding to a wide voltage range.

Whether the DC/DC converter 12 should convert a voltage is controlled by a control circuit 14. The control circuit 14 continuously supervises the output voltage of the AC adapter or battery using voltage sensors 16a, 16b. When the output voltage from the AC adapter or battery exceeds a reference voltage, if a power source is turned on with an external switch 20, then the DC/DC converter 12 is forced to the operating mode to supply power to the functional circuit 10. In the meantime, if the external switch 20 is maneuvered so as to shut off the power supply to the electronic device, the control circuit 14 forces the DC/DC converter 12 to halt its operation and stops supplying power to the functional circuit 10.

When it is judged that both the AC adapter and the battery are used, the control circuit 14 charges the battery on certain conditions. Charging the battery is carried out by a battery control circuit 18. Where both the AC adapter and the battery are used, the control circuit 14 causes the battery control circuit 18 to operate so that part of the power supplied from the AC adapter is returned to charge the battery.

Whether both the AC adapter and the battery are used is checked by the control circuit 14 via the voltage sensors 16a, 16b.

The control circuit 14 is thus playing a major role in supplying power to the functional circuit 10, charging the battery, etc. It should be noted that the control circuit 14 itself receives power from a power circuit 22.

As described above, in the conventional electronic devices including the notebook-sized PC and the cellular phone, the control circuit 14 still operates while the electronic device is inactivated and the DC/DC converter 12 is stopped. This is because the control circuit 14 continuously supervises the connect/disconnect of the AC adapter or the battery, and the turn on/off of the switch 20 as well. Namely, the control circuit 14 consumes power, though it is very little, via the power circuit 22 even when the electronic device is inactivated, and therefore receives power from the AC adapter or the battery.

For example, in a typical notebook-sized PC, the control circuit 14 may consume as much as about 20 mA current via the power circuit 22. As a result, a battery having a 1600 mA capacity would be completely discharged in about three days, even if the notebook-sized PC has not been activated.

Japanese Patent Laid-Open Publication No. Hei 5-241696 discloses an example of a PC which can save the battery depending on the presence or the absence of an AC adapter. Also, Japanese Patent Laid-Open Publication No. Hei 6-83491 discloses a technique for minimizing the overall power consumption of the notebook-sized computer by collecting and interpreting the power-related data for each process element. The technique allows the control of the power supply. Further, Japanese Patent Laid-Open Publication No. Hei 6-161617 discloses a technique for reducing the power consumption of the power supply control device itself.

As described above, there has been a problem in the conventional electronic devices that the battery might be used up only in a few days, even if the power source is turned off, due to the continuous slight power consumption of the electronic device while it is inactivated.

SUMMARY OF THE INVENTION

The present invention is made to solve the above problem, and an object of the present invention is to provide a control device for a power source of the electronic device, which is capable of reducing the power consumption while the electronic device is inactivated.

According to one aspect of the present invention, a low power consumption switching device for a power source is provided, which is disposed between a power source section and a power receiving circuit receiving power from said power source section. The switching device comprises: a main switch element connected between the power source section and the power receiving circuit; a start switch which is turned on at a predetermined timing for supplying an output signal from the power source section to the main switch element, to thereby set the main switch element to the conductive state; and a system actuating circuit for supplying the main switch element with an actuating signal indicative of the power receiving circuit being in operation, to thereby set the main switch element to the conductive state, wherein the actuating signal disappears when the power receiving circuit halts its operation, and the main switch element is brought to the non-conductive state in response to the start switch being turned off.

In the low power consumption switching device for a power source, the start switch supplies the output signal of the power source section to the main switch element in response to a predetermined operation by an operator, to thereby set the main switch to the conductive state.

In the low power consumption switching device for a power source, the start switch outputs a start signal as well as the output signal at said predetermined timing, and when the start signal is output, if the power receiving circuit is caused to operate, the system actuating circuit supplies the actuating signal to the main switch element.

The low power consumption switching element for a power source further comprises a constant conducting means for supplying an output signal of an AC power source section to bring the main switch element to the conductive state when the AC power source section is connected to the main switch as the power source section, the AC power source section receiving power from a commercial power source.

The low power consumption switching device for a power source further comprises a stabilized power supply circuit connected to the main switch element for receiving power from the power source section via the main switch element, wherein the system actuating circuit includes control means for controlling the operation of the stabilized power supply circuit, the control means outputting a command signal to cause the stabilized power supply circuit to operate, and also outputting the command signal to the main switch element as the actuating signal.

The low power consumption switching device for a power source further comprises a DC/DC converter circuit connected to the main switch element for receiving power from the power source section via the main switch element, wherein the system actuating circuit includes control means for controlling the operation of the DC/DC converter, the control means outputting a command signal to cause the DC/DC converter circuit to operate, and also outputting the command signal to the main switch element as the actuating signal.

The low power consumption switching device for a power source further comprises a battery control circuit for controlling charging/discharging of a battery when the battery is connected to the main switch element as the power source section, wherein the system actuating circuit includes control means for controlling the operation of the battery control circuit, the control means outputting a command signal to cause the battery control circuit to operate, and also outputting the command signal to the main switch element as the actuating signal.

DESCRIPTION OF THE PREFERRED EMBODIMENT

The preferred embodiment of the present invention will be described below with reference to the attached drawings.

Embodiment 1

Figure 1A:
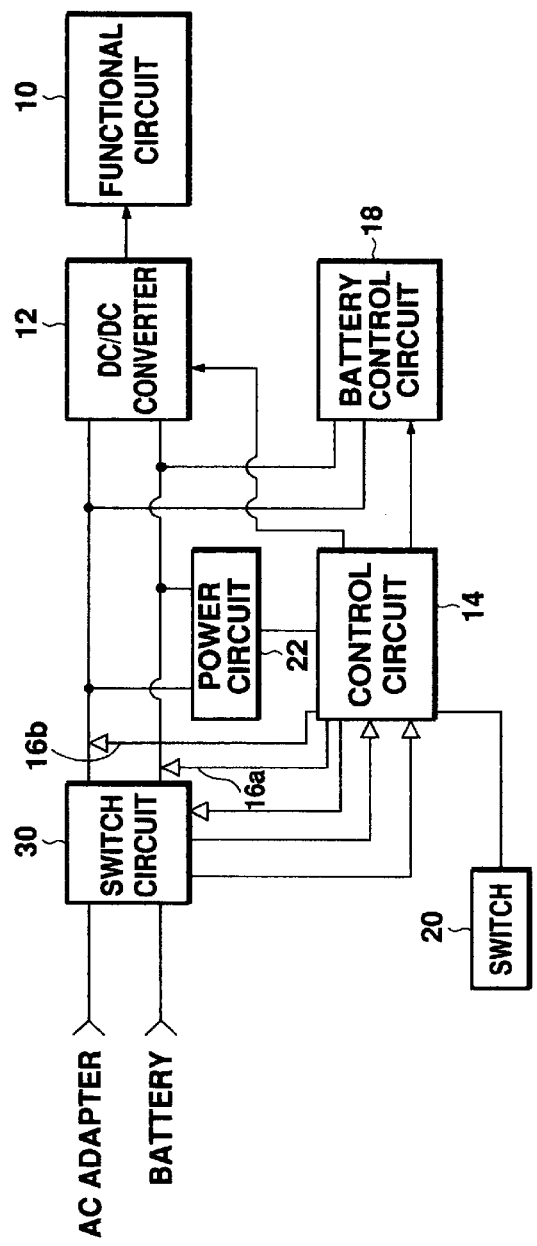
FIGS. 1A and 1B are block diagrams showing the configuration of a power supply switch device according to a preferred embodiment of the present invention.
Figure 1B:
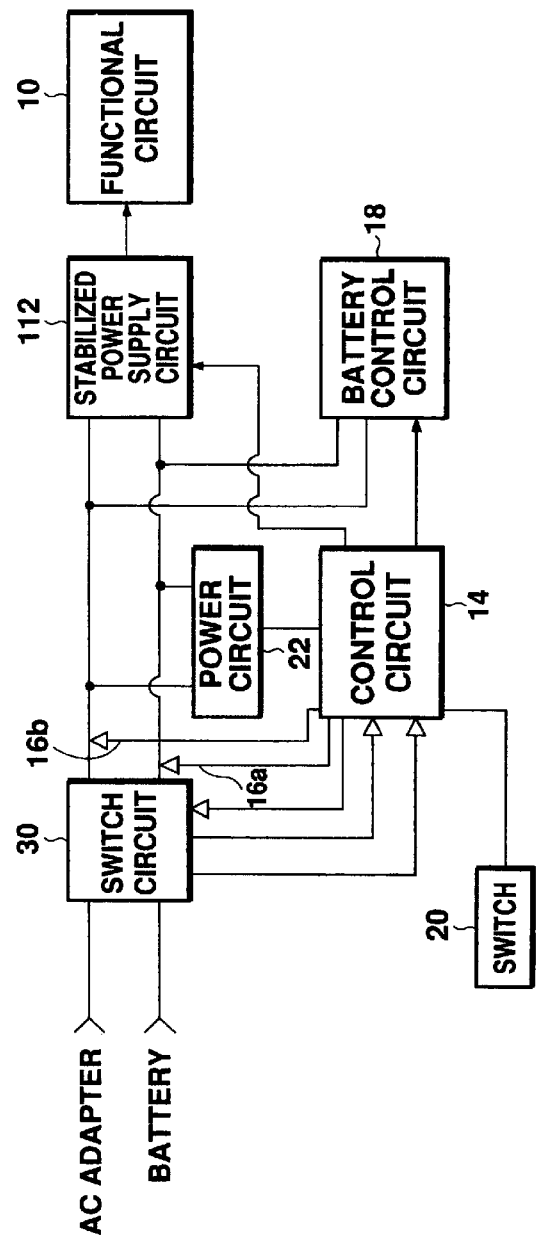

FIGS. 1A and 1B are block diagrams showing the configuration of a power supply circuit according to a preferred embodiment of the present invention.

The principle of the present invention with respect to the power supply circuit according to the embodiment is detailed below.

The present invention is devised by modifying the conventional technique with respect to the following points:

(1) The DC/DC converter 12 needs to be activated only when a particular electronic device is in operation. Similarly, the battery control circuit 18 should be activated only when the AC adapter is connected or when the particular electronic device is in operation with power supply supplied from the battery; and (2) Power consumption can be eliminated by completely stopping the control circuit 14, but it is at least necessary to supply power to the control circuit 14 and operate it while the switch 20 is pressed down to activate the electronic device.

In view of the above, the embodiment employs a switch circuit 30 connected to the output side of the AC adapter and the battery, as shown in FIGS. 1A and 1B, to thereby supply power to the DC/DC converter 12 via the switch circuit 30.

It should be noted that the AC adapter and the battery as used herein as the power source are examples of the power source section defined in the appended claims. Also, the functional circuit, such as a cellular phone or a notebook-sized PC, is an example of the power receiving circuit of the claims.

The power supply to the control circuit 14 is controlled by the switch circuit 30 disposed before the power circuit 22. By shutting off the switch circuit 30 while the electronic device is not in operation, it is possible to bring the power supply to the control circuit 14 to zero.

However, it is not sufficient to simply provide the switch circuit 30 and cut off the AC adapter and the battery from the control circuit 14. Since the control circuit 14 is not activated, it does not detect the turning on of the switch 20, resulting in the inability to start the electronic device.

Figure 2:
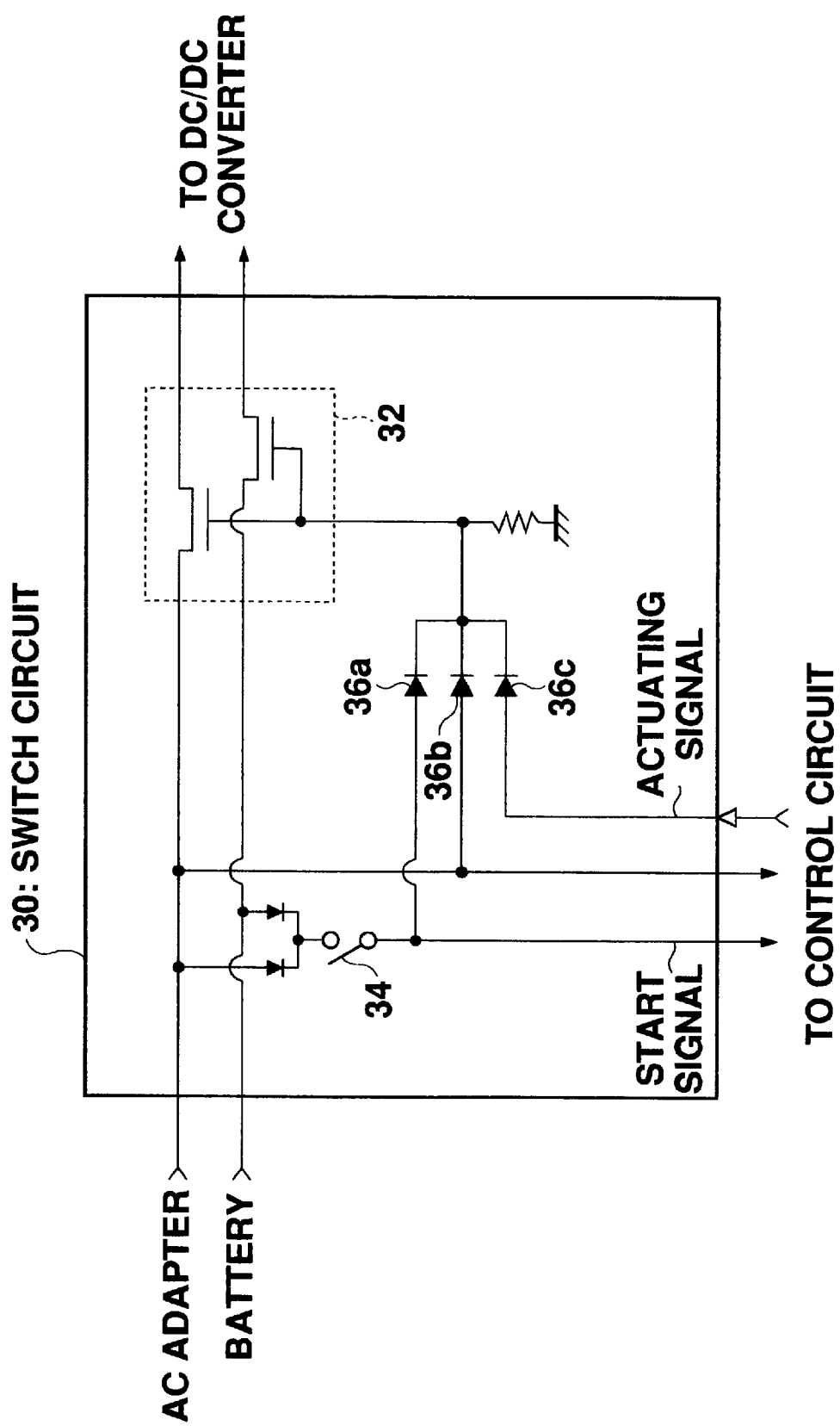
FIG. 2 is a circuit diagram showing the detailed configuration of the switch circuit.

To handle this situation, the switch circuit 30 of the embodiment will operate in the following manner. FIG. 2 shows a detailed configuration of the switch circuit 30. As shown in FIG. 2, the switch circuit 30 includes a main switch 32 which guides the current from the AC adapter and the battery to, e.g., the DC/DC converter 12. As seen in the figure, the main switch of this embodiment is formed by two FETs. One FET is disposed to connect to the AC adapter, while the other is connected to the battery.

These FETs are examples of the main switch element defined in the appended claims.

In the present embodiment, the main switch element as it is defined in the claims has been formed by the FET, but it is also preferable to use other transistors or thyristors as the main switch element.

Further, the present embodiment employs only two FETs as the main switch element, but it is also preferable to use two or more (i.e., plural) transistors depending on the number of power supply sections, such as the battery.

In order to conduct current through the main switch 32, a predetermined voltage has to be applied to the gate of the FETs by which the main switch 32 is formed. There are three ways of applying the voltage, as detailed below.

First, an operator may turn on a switch 34 when the AC adapter or the battery is connected. While the switch 34 is turned on, the predetermined voltage will be applied to the gate of the FETs constituting the main switch 32 via a diode 36*a*. As a result, the main switch 32 is rendered conductive as long as the switch 34 is turned on.

It should be noted that the switch 34 is an example of the start switch as it is defined in the appended claims.

A second method to conduct current through the FETs constituting the main switch 32 is to connect the AC adapter. It is assumed that the AC adapter outputs a normal output voltage. The output voltage of the AC adapter is applied to the gate of the FETs constituting the main switch 32 via a diode 36*b*, as shown in FIG. 2. In this way, when the AC adapter is connected, the switch circuit 30 becomes conductive. The output voltage of the AC adapter is sent to the DC/DC converter 12 or the like.

A third method is to apply an external signal to the gate of the FETs via a diode 36*c* indicated in FIG. 2.

In the embodiment, the signal to be applied to the gate of the FETs in response to turning on of the switch 34 is also sent to the control circuit 14. By checking this signal, the control circuit 14 can know whether or not the switch 34 has been turned on. Similarly, the output signal of the AC adapter is sent not only to the gate of the FET but also to the control circuit 14 via the diode 36b. The control circuit 14 can thus know if the AC adapter has been connected.

It should be noted that the control circuit 14 has a function corresponding to the system actuating circuit as defined in the appended claims.

As mentioned above, the external signal may also be used to conduct the FETs. In this embodiment, the external signal is provided from the control circuit 14. In other words, the switch circuit 30 can be rendered conductive by the control circuit 14. The signal from the control circuit 14 is an example of the actuating signal defined in the appended claims.

Having described the configuration of the circuit, the description is now given to the operations with respect to turning on/off of the power supply of the electric device according to this embodiment.

With the AC adapter or the battery being connected, a user turns on the switch 34 to start a particular electric device. Then, a predetermined voltage is applied to the gate terminal of the FET via the diode 36a so that the switch circuit 30 becomes conductive. Thus, the power circuit 22 and the control circuit 14 start their operations.

Once the switch circuit 30 becomes conductive and the power circuit 22 and the control circuit 14 start operating, the control of the DC/DC converter 12 and the battery control circuit 18 will begin. First, the control circuit 14 checks whether or not the switch 34 has been turned on. In the embodiment, the signal to be sent to the control circuit 14 in response to turning on of the switch 34 is referred to as a start signal. The start signal of the embodiment is an example of the start signal defined in the appended claims.

By examining the start signal output from the switch 34, the control circuit 14 can know whether the electric device should be started.

In particular, if the control circuit 14 confirms that the start signal is at a voltage higher than a predetermined voltage, the control circuit 14 judges that the electric device should be activated and outputs a command signal to activate the DC/DC converter 12. Simultaneously, the control circuit 14 sends back an actuating signal, which represents that the electric device is in operation, to the switch circuit 30. By supplying the actuating signal to the switch circuit 30, as indicated in FIG. 2, the FETs of the main switch 32 will be rendered conductive. It should be noted that the actuating signal of the embodiment is an example of the actuating signal as defined in the appended claims.

Alternatively, it is also preferable that the control circuit 14 would control a stabilized power supply circuit 112, instead of the DC/DC converter 12, as shown in FIG. 1B. In either case, the control circuit 14 may include some means corresponding to the control means as defined in the appended claims, as shown in FIGS. 1A and 1B.

As described above, once the electronic device has been started and the voltage of the actuating signal becomes higher than the predetermined voltage, even if the user puts his/her finger off the switch 34 and leaves it open, the main switch 32 still remains in the conductive state. When the switch 34 is opened, any voltage which has been applied to the gate of the FETs via the diode 36a will disappear. However, the control circuit 14 activates the DC/DC converter 12 and, at the same time, provides the switch circuit 30 with the actuating signal indicating that the electronic device is in the operating mode. As mentioned above, the actuating signal is applied to the gate of the FETs via the diode 36c, so that the main switch 32 can remain conductive even after the switch 34 is opened.

While the electronic device is not in operation, the switch circuit 30 is absolutely non-conductive, and the power circuit 22 and the control circuit 14 are completely stopped. Thus, the power consumption in the elements such as the control circuit 14 is down to zero. This is the substantial reduction in power consumption during the non-operating state of the electronic device. When the switch 34 is turned on and rendered conductive, the main switch 32 is forced into the conductive state and, accordingly, the power circuit 22 and the control circuit 14 are started. After that, the control circuit 14 activates the DC/DC converter 12 in order to start the electronic device, and supplies the actuating signal to the switch circuit 30 to indicate that the device is now in operation. Once the actuating signal is sent, even if the user releases the switch 34, the switch circuit 30 will remain conductive as long as the actuating signal continues to be supplied.

In the embodiment, the control circuit 14 forces the electronic device into the operating mode by supplying a control signal to the DC/DC converter 12. The control signal may be considered as a signal representing the state where the electronic device is in operation. Therefore, it is also preferable to employ such a control signal supplied to the DC/DC converter 12 as the actuating signal to be supplied to the switch circuit 30. Although, in FIG. 1, the actuating signal to be supplied to the switch circuit is different from the control signal to the DC/DC converter 12, the same signal can be used for these two signals.

The starting operation of the electronic device in response to the switch 34 being turned on has been described.

Alternatively, the main switch 32 within the switch circuit 30 becomes conductive when the AC adapter is connected, as shown in FIG. 2. In this case, the electronic device will not start, but the switch circuit 30 itself becomes conductive. As a result, the power circuit 22 and the control circuit 14 constantly receive power regardless of whether the user turns on/off the switch, because, unlike the battery, the power consumption may unlikely be the problem in the case of using the AC adapter, as it acquires power from the commercial power supply.

The AC adapter of this embodiment is an example of the AC power supply section defined in the appended claims, since the AC adapter as used herein receives power from the commercial power supply. In this respect, the wiring used for supplying the output signal of the AC adapter to the gate of the FETs, and the diode 36b are examples of the constant conducting means defined in the claims.

Further, one of the two FETs included in the switch 32, as shown in FIG. 2, to which the AC adapter is connected, is an example of the AC adapter main switch circuit defined in the claims.

When the AC adapter is connected, the control circuit 14 is started to first examine whether the start signal, which is the output signal of the switch 34, is higher than the predetermined voltage.

Where the AC adapter is connected and the control circuit 14 is started, the switch 34 remains inactivated, such that the value of the start signal should not exceed the predetermined value. As a result, the control circuit 14 judges that there is no need to start the electronic device, and thus outputs no control signal for activating the DC/DC converter 12. Instead, the control circuit 14 supplies the control signal to the battery control circuit 18, to thereby allow the battery to be charged from the AC adapter, although the electronic device is not in operation. The control circuit 14 supervises the output voltage of the AC adapter and the battery using the voltage sensors 16a, 16b. On certain conditions, therefore, the control circuit 14 controls the battery control circuit 18 to cause the AC adapter to charge the battery. It is noted that the conventional control circuit 14 and the battery control circuit 18 have the battery charging function. In the case where the control circuit 14 controls the battery control circuit 18, the control circuit 14 includes some means corresponding to the control means as defined in the appended claims.

When the AC adapter is used, the control circuit 14 of the present embodiment outputs a predetermined control signal for the control of the battery control circuit 18, but does not output any actuating signal representative of the state where the electronic device is in operation.

However, in the case where the electronic device is a battery charging device which aims to charge the battery, or any other battery maintenance device, it might be preferable to output the above-mentioned actuating signal from the control circuit 14, as well as the predetermined control signal to the battery control circuit 18. In this configuration, it is still preferable to use the control signal for the battery control circuit 18 as the actuating signal for the switch circuit 30.

The description has thus been made as to the manner by which the main switch 32 within the switch circuit 30 is forced to the conductive state when the switch 34 is turned on or the AC adapter is connected. In particular, when the electronic device is run by the battery, the main switch 32 remains non-conductive unless the switch 34 is turned on, whereby the power consumption of the control circuit 14 and the power circuit 22 can be completely eliminated. This is useful for any electronic device activated by the battery, such as the notebook-sized PC, in preventing the waste of power of the battery and extending the shelf life of the battery.

Now, the description will be made as to how the main switch 32 within the switch circuit 30 becomes non-conductive from the conductive state.

As seen from FIG. 2, the main switch element 32 becomes conductive when any of the following conditions is satisfied, i.e., the switch 34 is turned on, the AC adapter is connected, or the control circuit 14 outputs the actuating signal. On the contrary, the main switch 32 shifts from the conductive state to the non-conductive state unless the switch 34 is activated, the AC adapter is connected, or the actuating signal from the control circuit 14 exceeds the predetermined voltage level.

For example, if the electronic device is turned off by maneuvering the switch 20 as in the conventional method, the control circuit 14 shifts the DC/DC converter 12 from the operating mode to the non-operating mode. Simultaneously, the control circuit 14 brings the actuating signal, which is supposed to be output externally, to the off state (i.e., the state where the signal is below the predetermined voltage level). In this state, unless the AC adapter is connected or the switch 34 is turned on, the switch 32 becomes non-conductive, as mentioned above. In other words, if the electronic device is run by the battery without using the AC adapter, the main switch 32 can automatically be rendered non-conductive when the electronic device is turned off (i.e., the power is cut off by maneuvering the switch 20). As a result, it is possible to completely eliminate the power supply to the power circuit 22 and the control circuit 14. This prevents the unnecessary power consumption of the battery while the electronic device is inactivated and extends the shelf life of the battery.

Embodiment 2

In the previous embodiment, the AC adapter and the battery, respectively, have a switch which is formed by an FET, and two FETs form the main switch 32.

Figure 3:
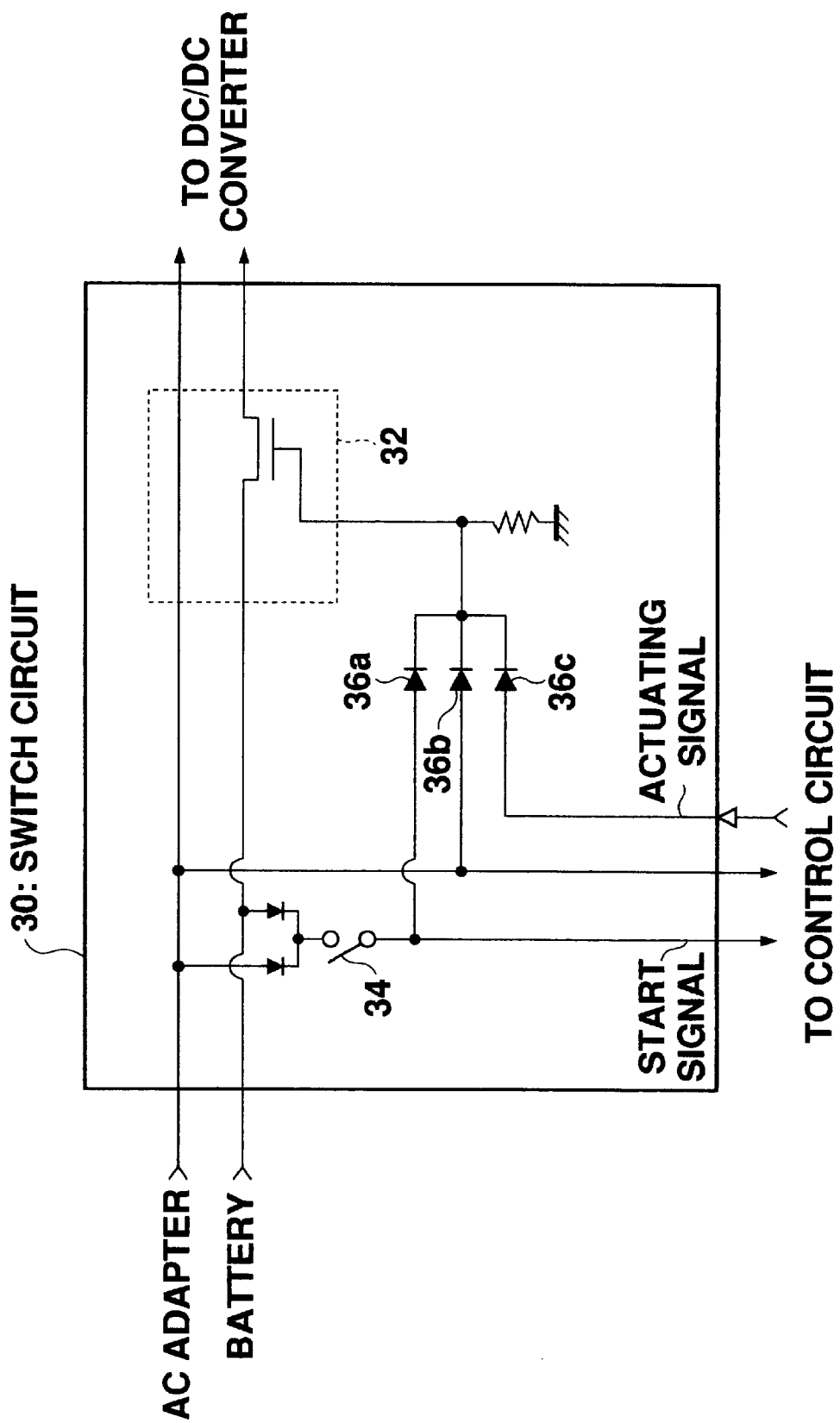
FIG. 3 shows the configuration of an alternative switch circuit.
Figure 4:
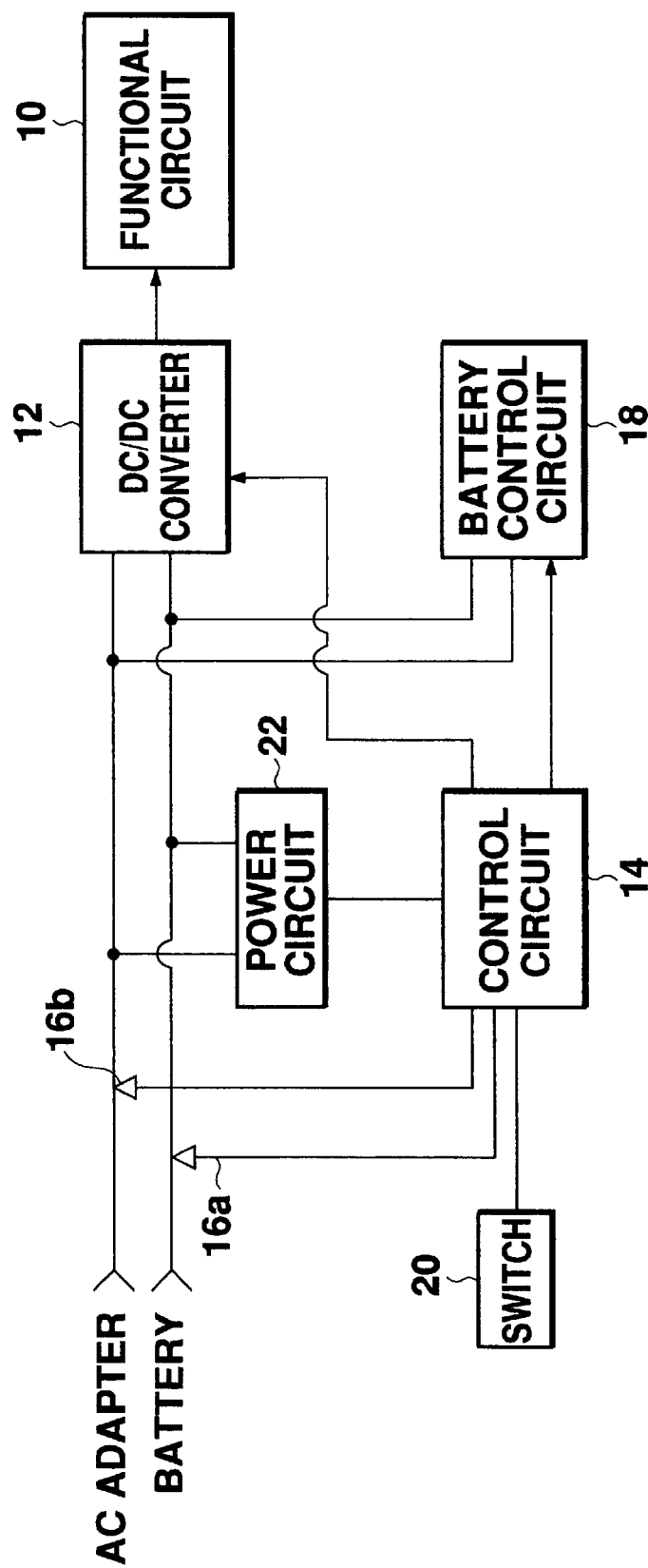
FIG. 4 is a block diagram showing a conventional power supply circuit used in an electronic device.

As already mentioned, since the main switch 32 is always conductive whenever the AC adapter is connected, it might be possible to omit the FET provided for the AC adapter. FIG. 3 shows a switch circuit 30 having a thus formed main switch 32. As shown in FIG. 3, the main switch 132 only includes the FET on the battery side, unlike the main switch 32 of FIG. 2, so that the power supply from the AC adapter is directly sent to the DC/DC converter or the like.

It can be understood that the main switch 32 of the embodiment 1 is kept conductive whenever the AC adapter is connected, on the premise that the cost of power from the AC adapter is so small that it may be negligible. However, the cost of the AC adapter never becomes zero. Therefore, it is also preferable to conduct the main switch 32 only after the switch 34 has been turned on when the AC adapter is used, as in the case where the battery is used. In this case, there is no need to supply any signal from the AC adapter to the control circuit, and the diode 36b may be deleted.

In practice, however, it is true that the cost of the commercial power supply is negligible, as mentioned in the embodiment 1. Therefore, in view of miniaturization of the devices, it may be preferable in many cases that the main switch 32 should always be in the conductive state if the AC adapter is connected. Specifically, it is more preferable to simplify the configuration of the device by deleting one FET, as shown in FIG. 3. The main switch 32 of FIG. 3 can operate in a similar manner to the circuit of FIG. 2, and is still capable of extending the shelf life of the battery.

In summary, according to the present invention, the main switch element becomes non-conductive when the power receiving circuit is stopped, so that the power consumption of the electronic device can almost completely be eliminated while it is inactive.

In addition, the main switch is set to the conductive state in response to the activation of the start switch. Thus, it is possible to start the electronic device even though no power has been consumed while it is stopped.

Further, the system actuating circuit supplies the actuating signal to the main switch element while the power receiving circuit is in operation, so that it is possible to continue supplying power to the power receiving circuit even after the start switch has been released.

The present invention can provide the simplified power supply switch device by maintaining the conductive state of the main switch element when the commercial power supply is employed.

Also, the present invention can provide the simplified power supply switch, as the command signal used to operate the stabilized power supply circuit is also used as the actuating signal.

A similar effect can be obtained by replacing the stabilized power supply circuit with the DC/DC converter circuit. That is, the start signal used to start the DC/DC converter circuit is also used as the actuating signal. Thus, the present invention can provide the simplified power supply switch element which reduces the power consumption.

The system actuating circuit of the present invention supplies the command signal to cause the battery control circuit to operate, and this command signal is also supplied to the main switch element as the actuating signal. Thus, the present invention can provide the simplified power supply switch element which reduces the power consumption.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A low power consumption switching device for a power source, which is disposed between a power source section and a power receiving circuit receiving power from said power source section, comprising:

a main switch element connected between said power source section and said power receiving circuit;

a start switch which is turned on at a predetermined timing for supplying an output signal from said power source section to said main switch element, to thereby set said main switch element to the conductive state; and a system actuating circuit for supplying said main switch element with an actuating signal indicative of said power receiving circuit being in operation, to thereby set said main switch element to the conductive state, wherein said actuating signal disappears when said power receiving circuit halts its operation, and said main switch element is brought to the non-conductive state in response to said start switch being turned off.

2. The low power consumption switching device for a power source according to claim 1, wherein said start switch supplies the output signal of said power source section to said main switch element in response to a predetermined operation by an operator, to thereby set said main switch to the conductive state.

3. The low power consumption switching device for a power source according to claim 1, wherein said start switch outputs a start signal as well as said output signal at said predetermined timing, and when said start signal is output, if said power receiving circuit is caused to operate, said system actuating circuit supplies said actuating signal to said main switch element.

4. The low power consumption switching element for a power source according to claim 1, further comprising constant conducting means for supplying an output signal of an AC power source section to bring said main switch element to the conductive state when said AC power source section is connected to said main switch element as said power source section, said AC power source section receiving power from a commercial power source.

5. The low power consumption switching device for a power source according to claim 1, further comprising a stabilized power supply circuit connected to said main switch element for receiving power from said power source section via said main switch element, wherein said system actuating circuit includes control means for controlling the operation of said stabilized power supply circuit, said control means outputting a command signal to cause said stabilized power supply circuit to operate, and also outputting said command signal to said main switch element as said actuating signal.

6. The low power consumption switching device for a power source according to claim 1, further comprising a DC/DC converter circuit connected to said main switch element for receiving power from said power source section via said main switch element, wherein said system actuating circuit includes control means for controlling the operation of said DC/DC converter, said control means outputting a command signal to cause said DC/DC converter circuit to operate, and also outputting said command signal to said main switch element as said actuating signal.

7. The low power consumption switching device for a power source according to claim 1, further comprising a battery control circuit for controlling charging/discharging of a battery when said battery is connected to said main switch element as said power source section, wherein said system actuating circuit includes control means for controlling the operation of said battery control circuit, said control means outputting a command signal to cause said battery control circuit to operate, and also outputting said command signal to said main switch element as said actuating signal.

\* \* \* \* \*